S. S. ADAMS.
BICYCLE TIRE AND RIM.
APPLICATION FILED OCT. 16, 1907.
906,182.
Patented Dec. 8, 1908.
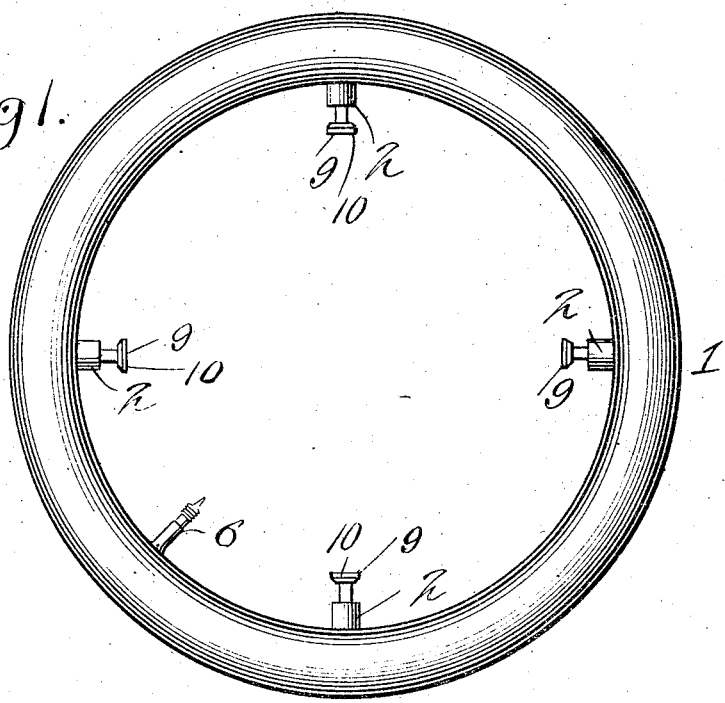
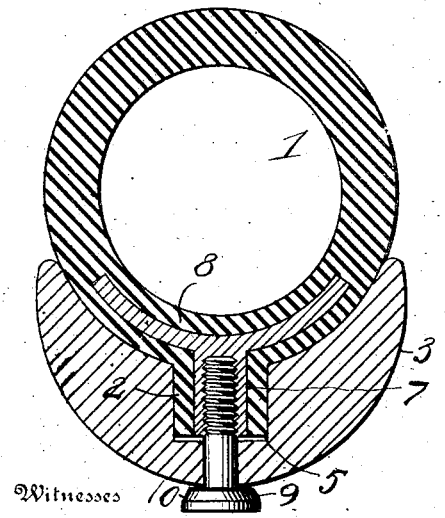
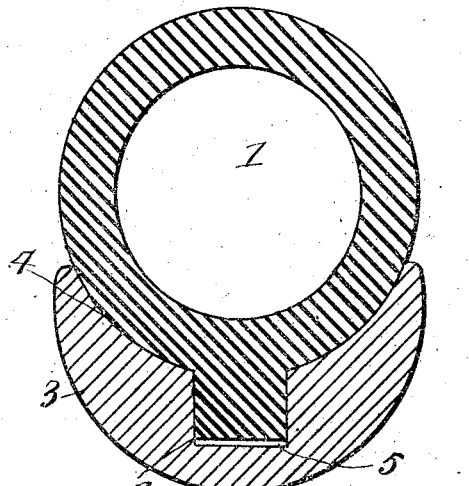
Inventor
Salathiel S. Adams

UNITED STATES PATENT OFFICE.

SALATHIEL S. ADAMS, OF MONROE COUNTY, KENTUCKY.

BICYCLE TIRE AND RIM.

No. 906,182.  Specification of Letters Patent.  Patented Dec. 8, 1908.

Application filed October 16, 1907. Serial No. 397,656.

*To all whom it may concern:*

Be it known that I, SALATHIEL S. ADAMS, a citizen of the United States, residing in the county of Monroe and State of Kentucky, have invented new and useful Improvements in Bicycle Tires and Rims, of which the following is a specification.

This invention relates to improvements in bicycle tires and rims particularly with reference to means for securing the tire to the rim without the necessity of using cement or other adhesive for fastening the tire in the annular peripheral recess of the rim, as hereinafter described and claimed.

In the accompanying drawings, Figure 1 is an elevation of a bicycle or other inflatable tire constructed in accordance with this invention. Fig. 2 is a detail transverse sectional view through the tire and through the wheel rim on which the tire is placed. Fig. 3 is a similar view on another plane, and showing one of the screws and nuts employed to secure the tire on the rim.

In accordance with this invention, I form the tire 1, which may be otherwise of any suitable construction, with a suitable number of inwardly extending radially disposed studs 2 which are integral therewith. The rim 3, which may be otherwise of any suitable construction, is provided in its outer side with a peripheral annular circumferential groove, seat or recess 4 for the reception of the inner side of the tire and is further provided with a suitable number of radially disposed recesses 5 which open outwardly into said groove, recess or seat 4 and serve to receive the studs 2 of the tire so that said studs and said recesses 5 coact to prevent the tire from "creeping" on the rim, and thereby injuring or breaking the usual inwardly extending valve 6 with which the tire is provided.

Embedded in the fabric of the tire at a suitable number of points are nuts 7 which extend through certain of the studs 2 and the inner ends of which are formed with curved wings or heads 8 which are also embedded in the fabric of the tire and extend laterally therein, thereby firmly anchoring the said nuts in place and preventing them from being drawn outwardly from the tire. The said nuts are tubular in form. Their outer ends are flush with the outer ends of the studs 2 in which they are embedded, and the said nuts are engaged by screws 9 which are radially disposed with reference to the wheel, extend through openings in the inner side of the rim at points concentric with the recesses 5 and are provided with enlarged heads 10 which bear against the inner side of the rim.

It will be understood from the foregoing and by reference to the drawings, more especially by reference to Fig. 3, that the said nuts which are embedded in the tire fabric and the said screws which extend through the rim coact to retain the studs 2 of the tire in the recesses 5 of the rim and hence effectually secure the tire on the rim. It will be further understood that no adhesive is required in fastening a tire which is constructed in accordance with my invention.

Having thus fully described the invention, what is claimed as new is:—

A tire having inwardly extending radially disposed studs, in combination with a rim having a seat in its outer side for the reception of the inner side of the tire and further provided with radially disposed recesses which open outwardly into such seat, terminate short of the inner side of the rim and serve for the reception of the tire studs, nuts employed for a portion of the studs, and each comprising a tubular portion embedded in and extended through one of the studs and a curved and broadened head embedded in the fabric of the tire, and screws extending through the inner side of the rim, engaging the tubular portions of the nuts and having heads bearing against the inner side of the rim, said screws serving in coaction with said tubular nuts to draw said studs into said recesses.

In testimony whereof I affix my signature in presence of two witnesses.

SALATHIEL S. ADAMS.

Witnesses:
P. E. VARGETT,
M. W. SCOTT.